United States Patent
Van Briggle et al.

(10) Patent No.: US 10,173,140 B2
(45) Date of Patent: Jan. 8, 2019

(54) INTERACTIVE GAMING SYSTEMS AND METHODS

(71) Applicant: Walmart Apollo, LLC, Bentonville, AR (US)

(72) Inventors: Christopher Ryan Van Briggle, Bentonville, AR (US); Christopher Mark Johnson, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/381,591

(22) Filed: Dec. 16, 2016

(65) Prior Publication Data

US 2017/0189816 A1    Jul. 6, 2017

Related U.S. Application Data

(60) Provisional application No. 62/273,596, filed on Dec. 31, 2015.

(51) Int. Cl.
*A63F 13/216*    (2014.01)
*A63F 13/798*    (2014.01)
(Continued)

(52) U.S. Cl.
CPC .......... *A63F 13/798* (2014.09); *A63F 13/216* (2014.09); *A63F 13/327* (2014.09);
(Continued)

(58) Field of Classification Search
None
See application file for complete search history.

(56) References Cited

U.S. PATENT DOCUMENTS

| 5,916,024 A | 6/1999 | Von Kohorn |
| 7,266,509 B2 | 9/2007 | Koenig |

(Continued)

FOREIGN PATENT DOCUMENTS

| EP | 2608856 | 7/2013 |
| WO | 2001037160 | 5/2001 |

OTHER PUBLICATIONS

Search Report in counterpart UK Patent Application No. 1621382.9, dated May 12, 2017; 4 pages.

*Primary Examiner* — Tramar Harper
(74) *Attorney, Agent, or Firm* — Schmeiser, Olsen & Watts LLP

(57) ABSTRACT

Provided is an interactive gaming system and method. The system includes a mobile computing device operating a gaming application and an achievement engine communicatively coupled to the mobile computing device, wherein the achievement engine receives and stores data related to use of the gaming application. An electronic offer redeemable in a physical store is generated by the achievement engine and sent to the mobile computing device in response to a user completing a predetermined event in the gaming application operating. The system includes a tracking system located in a store associated with the interactive gaming system. The tracking system identifies the mobile computing device operating in the store and sends event data to the achievement engine in response to determining the user has performed an in-store trigger event. The mobile computing device receives gaming benefits in response to the achievement engine processing the event data received from the tracking system.

12 Claims, 5 Drawing Sheets

(51) Int. Cl.
*H04W 4/80* (2018.01)
*A63F 13/35* (2014.01)
*H04W 4/021* (2018.01)
*A63F 13/69* (2014.01)
*A63F 13/92* (2014.01)
*A63F 13/327* (2014.01)
*A63F 13/61* (2014.01)
*A63F 13/792* (2014.01)
*H04W 84/12* (2009.01)

(52) U.S. Cl.
CPC .............. *A63F 13/35* (2014.09); *A63F 13/61* (2014.09); *A63F 13/69* (2014.09); *A63F 13/792* (2014.09); *A63F 13/92* (2014.09); *H04W 4/021* (2013.01); *H04W 4/80* (2018.02); *H04W 84/12* (2013.01)

(56) References Cited

U.S. PATENT DOCUMENTS

| | | | |
|---|---|---|---|
| 8,444,468 B2 | 5/2013 | Luciano, Jr. et al. | |
| 8,639,573 B2 | 1/2014 | Wilen | |
| 8,845,436 B1* | 9/2014 | Norton | A63F 13/216 455/457 |
| 2002/0090985 A1* | 7/2002 | Tochner | A63F 13/12 463/1 |
| 2002/0143619 A1 | 10/2002 | Laurie | |
| 2004/0092311 A1* | 5/2004 | Weston | A63F 13/10 463/42 |
| 2005/0009608 A1* | 1/2005 | Robarts | A63F 13/216 463/42 |
| 2005/0049022 A1* | 3/2005 | Mullen | A63F 13/12 463/1 |
| 2005/0049940 A1* | 3/2005 | Tengler | G06Q 10/087 705/21 |
| 2006/0105838 A1* | 5/2006 | Mullen | A63F 13/211 463/31 |
| 2006/0287105 A1* | 12/2006 | Willis | A63F 13/12 463/42 |
| 2007/0138268 A1* | 6/2007 | Tuchman | G06Q 30/02 235/383 |
| 2008/0009349 A1* | 1/2008 | Wolfe | H04W 4/02 463/42 |
| 2009/0005140 A1* | 1/2009 | Rose | A63F 13/00 463/7 |
| 2009/0287570 A1 | 11/2009 | Adamousky et al. | |
| 2010/0124991 A1* | 5/2010 | O'Sullivan | G06Q 30/02 463/42 |
| 2011/0086712 A1 | 4/2011 | Cargill | |
| 2011/0191184 A1* | 8/2011 | Blackhurst | G06Q 30/02 705/14.57 |
| 2011/0319148 A1* | 12/2011 | Kinnebrew | A63F 13/216 463/1 |
| 2012/0052954 A1* | 3/2012 | Zhu | A63F 13/10 463/42 |
| 2012/0129590 A1* | 5/2012 | Morrisroe | A63F 13/65 463/25 |
| 2012/0149475 A1* | 6/2012 | Schick | G06Q 30/02 463/42 |
| 2012/0244945 A1* | 9/2012 | Kolo | A63F 13/61 463/42 |
| 2014/0004940 A1 | 1/2014 | Wissner-gross et al. | |
| 2014/0012652 A1 | 1/2014 | Levin et al. | |
| 2014/0058813 A1 | 2/2014 | Levi et al. | |
| 2015/0278842 A1 | 10/2015 | Thiam | |
| 2016/0132161 A1* | 5/2016 | Kalb | G06F 3/048 463/31 |

\* cited by examiner

INTERACTIVE GAMING SYSTEMS AND METHODS

CROSS REFERENCE TO RELATED APPLICATION[S]

This application claims priority to U.S. Provisional Patent Application entitled "INTERACTIVE GAMING SYSTEMS AND METHODS," Ser. No. 62/273,596, filed Dec. 31, 2015, the disclosure of which is hereby incorporated entirely herein by reference.

FIELD OF THE INVENTION

The invention relates generally to an interactive gaming system, and more specifically, to interactive gaming systems and methods for incorporating real world activity into the virtual game environment.

BACKGROUND

There are various electronic gaming systems that link to shopping. These existing systems operate to allow a user to collect points, such as loyalty points. These loyalty points may be redeemed to purchase items at a discounted price. These points may be redeemable in a store or through an e-commerce website. However, these systems lack in the ability for the gaming system to utilize tasks and events that occur in a real world environment to be tracked and applied in the virtual game environment. Accordingly, there is a need for an improved system.

BRIEF SUMMARY

In one aspect, provided is an interactive gaming system comprising: a mobile computing device operating a gaming application; an achievement engine communicatively coupled to the mobile computing device, wherein the achievement engine receives and stores data related to use of the gaming application; an electronic offer generated by the achievement engine and sent to the mobile computing device in response to a user completing a predetermined event in the gaming application operating on the mobile computing device, wherein the electronic offer is redeemable in a physical store; and a tracking system communicatively coupled to the achievement engine, the tracking system located in a store associated with the interactive gaming system, wherein: the tracking system identifies the mobile computing device operating the gaming application in the store and sends event data to the achievement engine in response to determining the user has performed an in-store trigger event; and the mobile computing device operating the gaming application receives gaming benefits for use in the gaming application in response to the achievement engine processing the event data received from the tracking system.

In another aspect, provided is a method of using an interactive gaming system, the method comprising: operating a gaming application installed on a mobile computing device; communicating data related to operation of the gaming application to an achievement engine communicatively coupled to the mobile computing device; storing the data related to operation of the gaming application in memory of the achievement engine; automatically generating an electronic offer by the achievement engine and delivering the electronic offer to the mobile computing device in response to completing a predetermined event in the gaming application, wherein the electronic offer is redeemable in a physical store; determining by a tracking system that the mobile computing device operating the gaming application is within a store associated with the interactive gaming system; sending event data to the achievement engine in response to determining the user has performed an in-store trigger event; and receiving gaming benefits at the mobile computing device operating the gaming application gaming benefits for use in the gaming application in response to the achievement engine processing the event data received from the tracking system.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Users of mobile computing devices, such as smartphones, often download mobile applications that operate on the mobile computing device. These mobile applications take on various forms. One common type of mobile application includes a game application. These game applications provide a user the ability for entertainment purposes in a virtual game environment. These game applications lack in the ability to build a game environment that links the physical real world environment with the virtual game environment.

The present inventive concepts combine the physical real world environment with the virtual game environment. Generally, the present invention includes an interactive game application that allows a user to earn rewards usable in the real world environment while earning achievements in the virtual game environment; and further allows a user to earn benefits in the virtual game environment based on real world event performed by the user.

Figure 1:
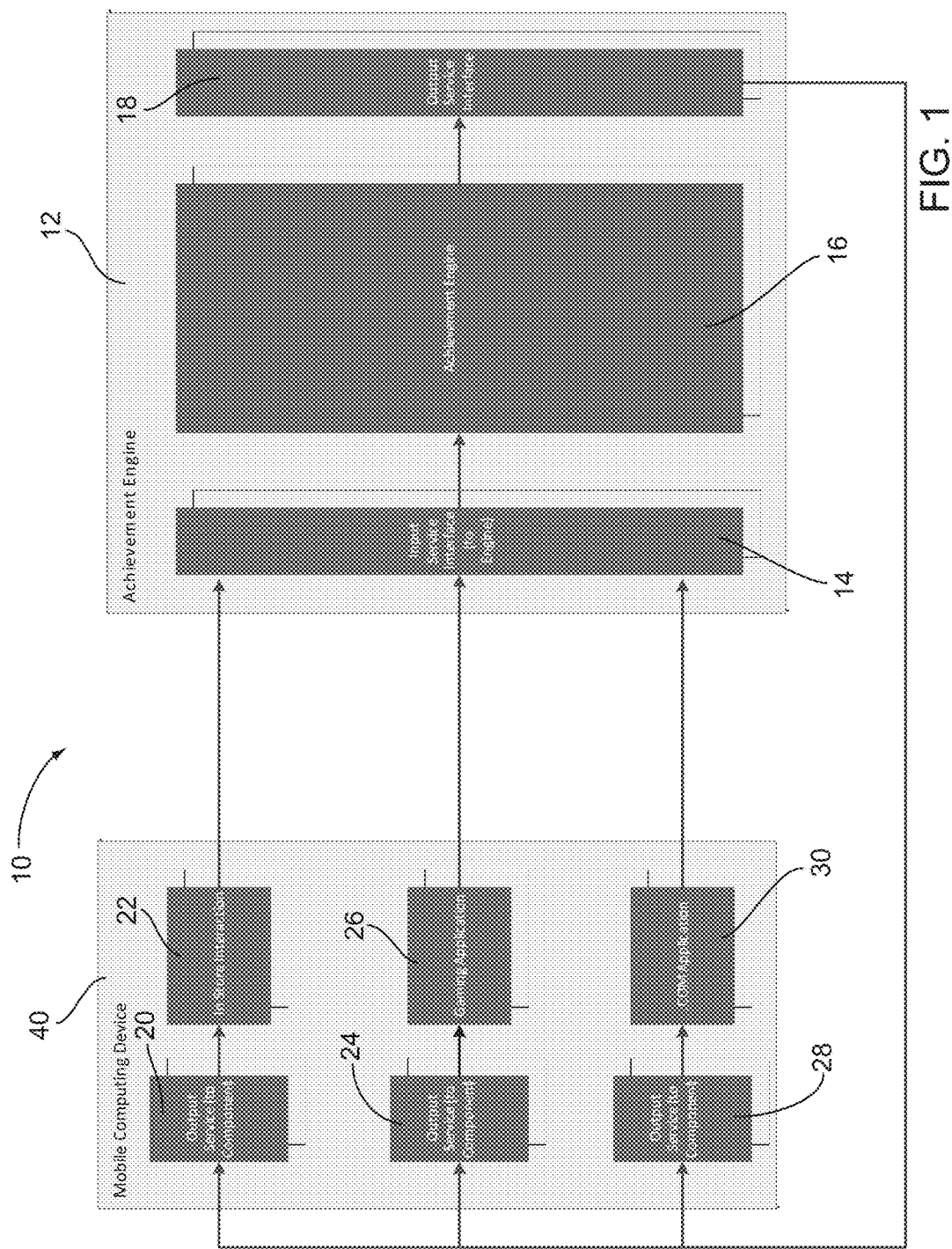
FIG. 1 is a block diagram of an achievement engine high level component, in accordance with some embodiments.

In some embodiments, as illustrated in FIG. 1, a block diagram of an interactive game system 10 is shown. The system 10 comprises a mobile computing device 40 and an achievement engine 12 communicatively coupled to the mobile computing device 40. The achievement engine 12 receives and stores data related to use of the gaming application. In some embodiments, the achievement engine 12 is a central computer, such as a server or the like, wherein the central computer operates achievement software to process information and data communicated from the mobile computing device 40, and further communicates information and data to the mobile computing device 40.

The mobile computing device 40 may communicate with the achievement engine 12 through various components. For example, in one embodiment, the mobile computing device 40 may operate and in-store interaction 22, wherein the mobile computing device 40 automatically determines that an in-store interaction 22 has occurred and communicates the same with the achievement engine 12 through an input service interface 14. The input service interface 14 transmits information or data to the achievement engine processor 16, wherein the achievement engine processor 16 processes the information provided from the mobile computing device 40 and determines a gaming benefit that sent from the achievement engine 12 through output service interface 18. The gaming benefit is received through the output service 20 of the mobile computing device 40.

In another embodiment, the mobile computing device 40 may operate a gaming application 26, wherein the mobile computing device 40 automatically determines that a goal is achieved in the gaming application 26 and communicates the same with the achievement engine 12 through an input service interface 14. The input service interface 14 transmits information or data to the achievement engine processor 16, wherein the achievement engine processor 16 processes the information provided from the mobile computing device 40 and determines a gaming benefit that sent from the achievement engine 12 through output service interface 18. The gaming benefit is received through the output service 24 of the mobile computing device 40.

In another embodiment, the mobile computing device 40 may operate an Internet application 30, wherein the mobile computing device 40 automatically determines that a goal is achieved in the Internet application 30 and communicates the same with the achievement engine 12 through an input service interface 14. The input service interface 14 transmits information or data to the achievement engine processor 16, wherein the achievement engine processor 16 processes the information provided from the mobile computing device 40 and determines a gaming benefit that sent from the achievement engine 12 through output service interface 18. The gaming benefit is received through the output service 28 of the mobile computing device 40.

Figure 2:
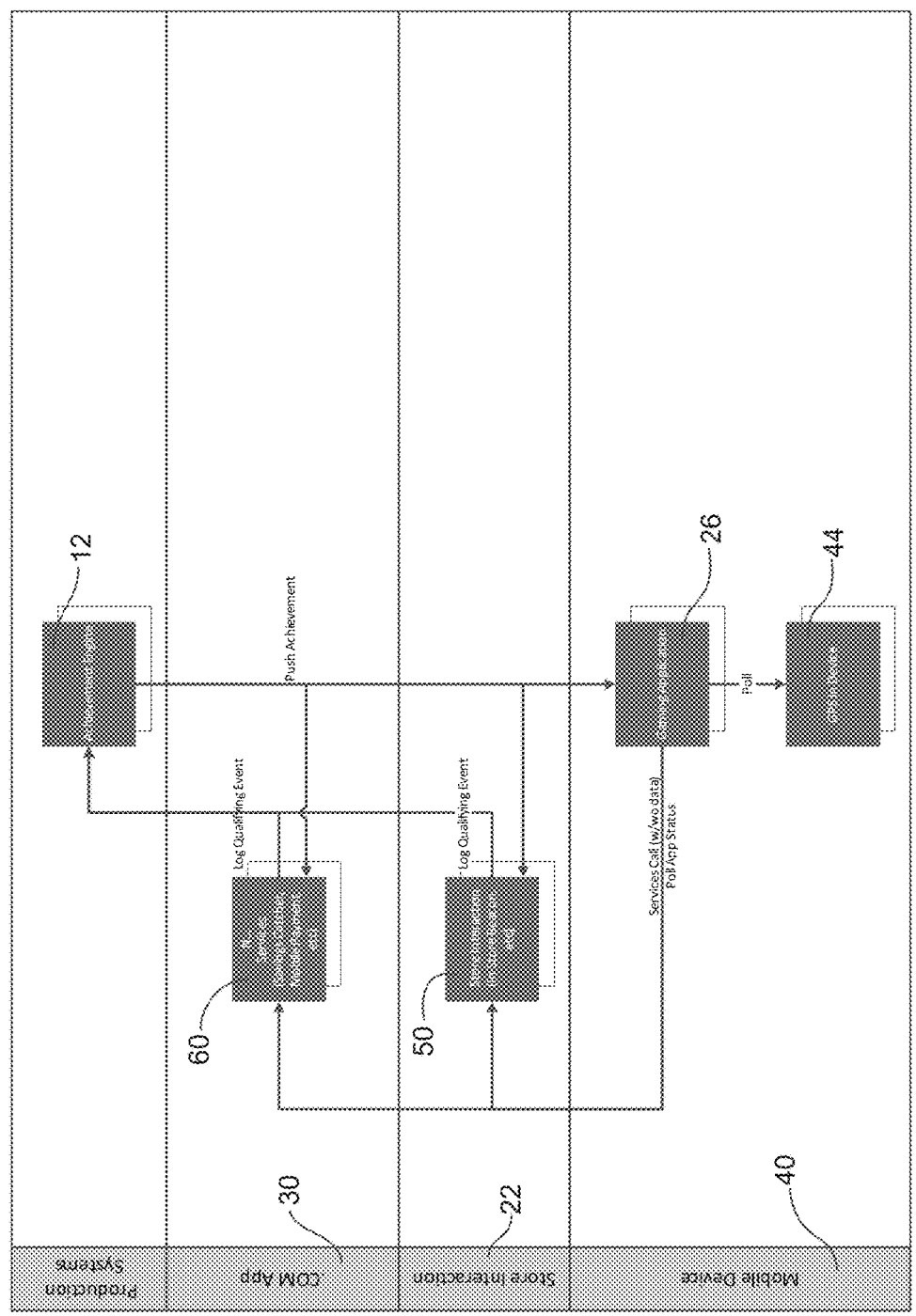
FIG. 2 is a block diagram of a gaming application, in accordance with some embodiments.

With reference to FIG. 2, in addition to a gaming benefit being sent from the achievement engine 12 to the mobile computing device 40, an electronic offer may be generated by the achievement engine 12 and sent to the mobile computing device 40 in response to a user completing a predetermined event in the gaming application 26 operating on the mobile computing device 40, wherein the electronic offer is redeemable in a physical store. The system may further include a tracking system 50 communicatively coupled to the achievement engine 12. The tracking system 50 may be located in a store associated with the interactive gaming system 10. The tracking system 50 identifies the mobile computing device 40 operating the gaming application 26 in the store and sends event data to the achievement engine 12 in response to determining the user has performed an in-store trigger event. The mobile computing device 40 operating the gaming application 26 receives gaming benefits for use in the gaming application 26 in response to the achievement engine 12 processing the event data received from the tracking system 50.

In embodiments, the tracking system 50 receives GPS data from the mobile computing device 40 operating the gaming application 26, wherein the GPS data is generate from a GPS device 44 and is used by the tracking system 50 to determine that the mobile computing device 40 is within the store. The tracking system 50 may also include a Wi-Fi beacon, wherein the Wi-Fi beacon communicates with the mobile computing device 40 to determine the location of the mobile computing device 40 within the store. In other embodiments, the tracking system 50 includes a Bluetooth beacon, wherein the Bluetooth beacon communicates with the mobile computing device 40 to determine the location of the mobile computing device 40 within the store.

In accordance with embodiments, the event data may be a purchase of a predetermined item, operating a self-checkout a predetermined number of times within a predetermined time frame, or other event or trigger that may be effected within a physical store, as represented in the Internet application 30 performing services 60.

In some embodiments, the achievement engine 12 receives location information from the mobile computing device 40. The achievement engine 12 automatically determines the electronic offers available to send to the mobile computing device 40 in response to processing the location information from the mobile computing device 40.

In embodiments of the system 10, the gaming benefits comprise unlocking access and providing use of predetermined game features, providing increased gaming ability, and combinations thereof.

Figure 3:
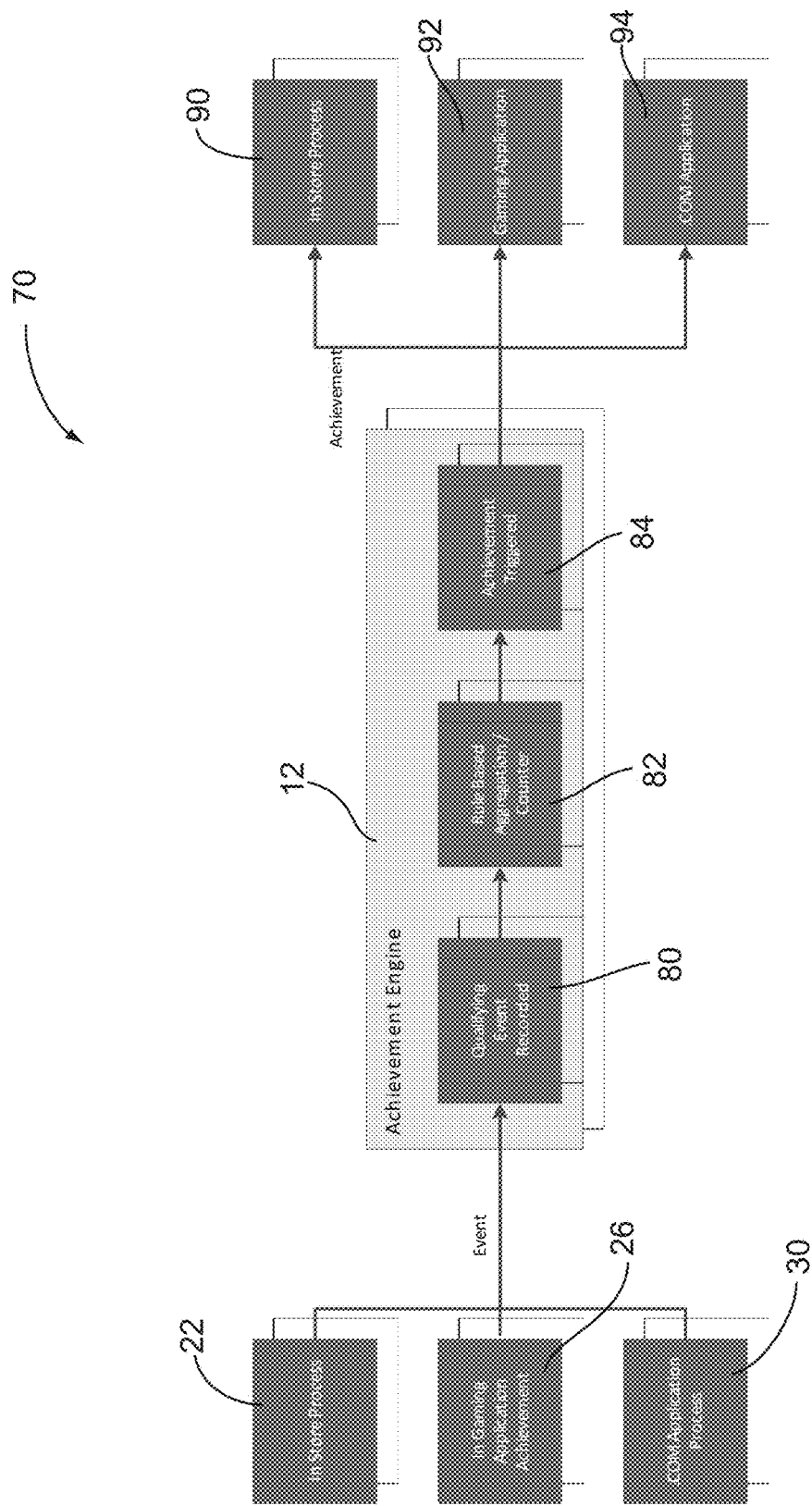
FIG. 3 is a flow diagram illustrating an application engine data flow, in accordance with some embodiments.
Figure 4:
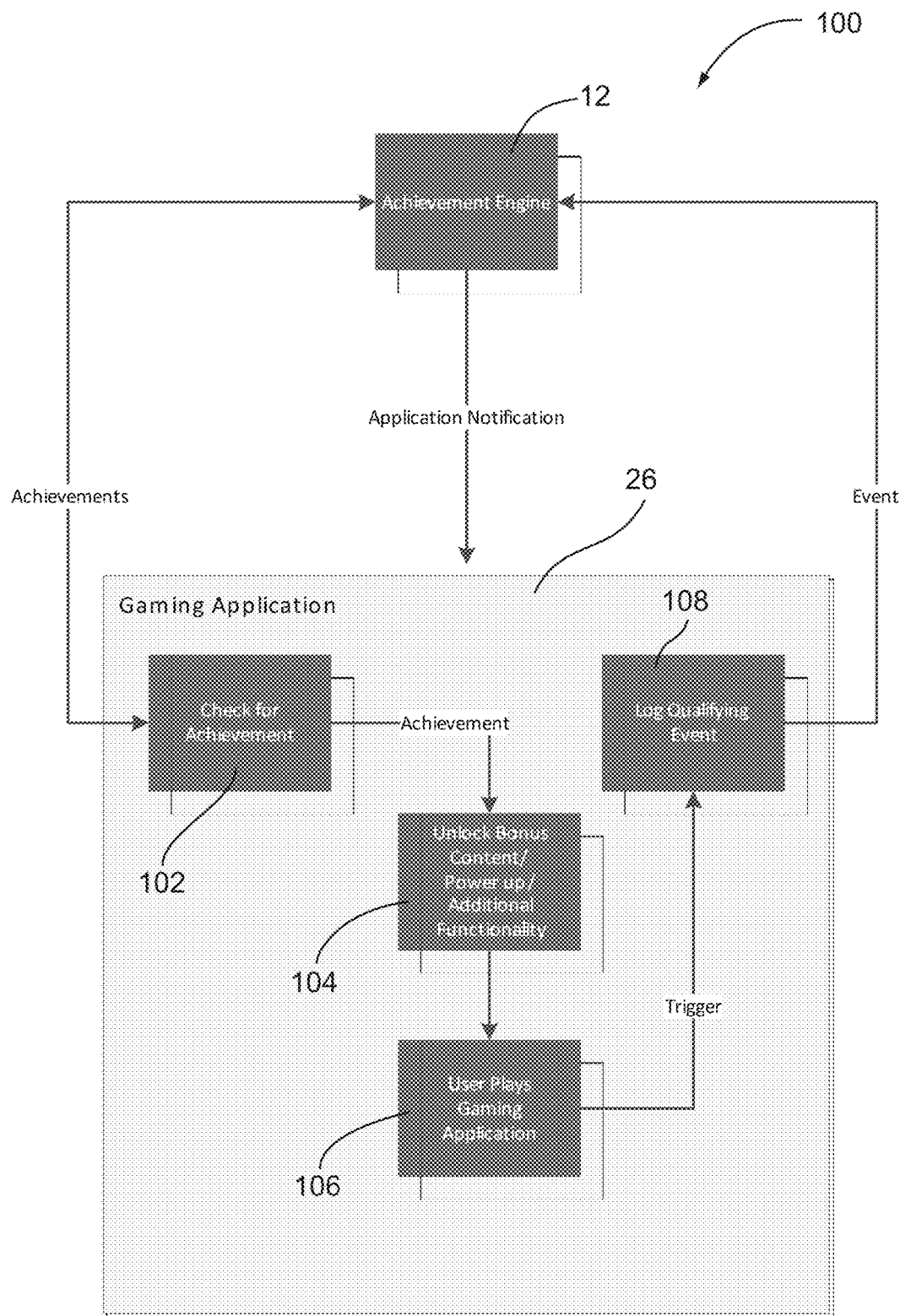
FIG. 4 is a flow diagram illustrating an application data flow, in accordance with some embodiments.

Referring further to the drawings, FIG. 3 depicts a flow diagram illustrating an application engine data flow 70 and FIG. 4 depict an application data flow 100, in accordance with some embodiments As shown in FIG. 3, the data flow through the achievement engine 12 includes on the in-store, process 22, the gaming application 26 or the Internet application 30 triggering an event and communicating data associated with the triggered event to the achievement engine 12. The achievement engine 12 determines if the triggered event is a qualifying event 80 and records the same in a memory of the achievement engine 12. Once the qualifying event 80 is recorded, the achievement engine 12 operates rule based aggregation/counter software 82 in order to determine an achievement associated with the qualifying event 80. The achievement engine 12 then triggers an achievement 84. The triggered achievement 84 is then communicated to the mobile computing device 40 related to an in-store process 90, a gaming application process 92 or an Internet application process 94.

A shown in FIG. 4, once the mobile computing device 40 operating the gaming application 26 receives the achievement the gaming data flow 100 begins. The gaming data flow 100 includes the gaming application 26 checking for an achievement 102 automatically on startup of the mobile gaming application 26. This check for an achievement 102 may occur at predetermined intervals, or may be a result of a push notification sent from the achievement engine 12. The check for an achievement 102 results in the mobile computing device 40 operating the mobile application to process the information associated with the achievement, and the gaming application may receive a gaming benefit 104, such as, but not limited to unlock bonus content, power up or make available additional functionality of the gaming application 26. At this point, the user may then play the gaming application 106, which may then trigger another qualifying event 108 and communicate the same to the achievement engine 12. This process of triggered evens and achievements associated with the triggered events may be continuously accomplished using the system 10.

It will be understood that while the drawing figures depict a mobile computing device 40 operating a mobile application 26, that other embodiments of the present invention may further include a computer instead of a mobile computing device and the mobile application 26 may be installable and operable on the computer. The function of the mobile gaming application may be the same when installed and operated on the computer. The same types of interaction with the achievement engine 12 is present with the mobile application 26 operating on a computer as is the interaction of the mobile computing device 40 with the achievement engine 12.

Figure 5:
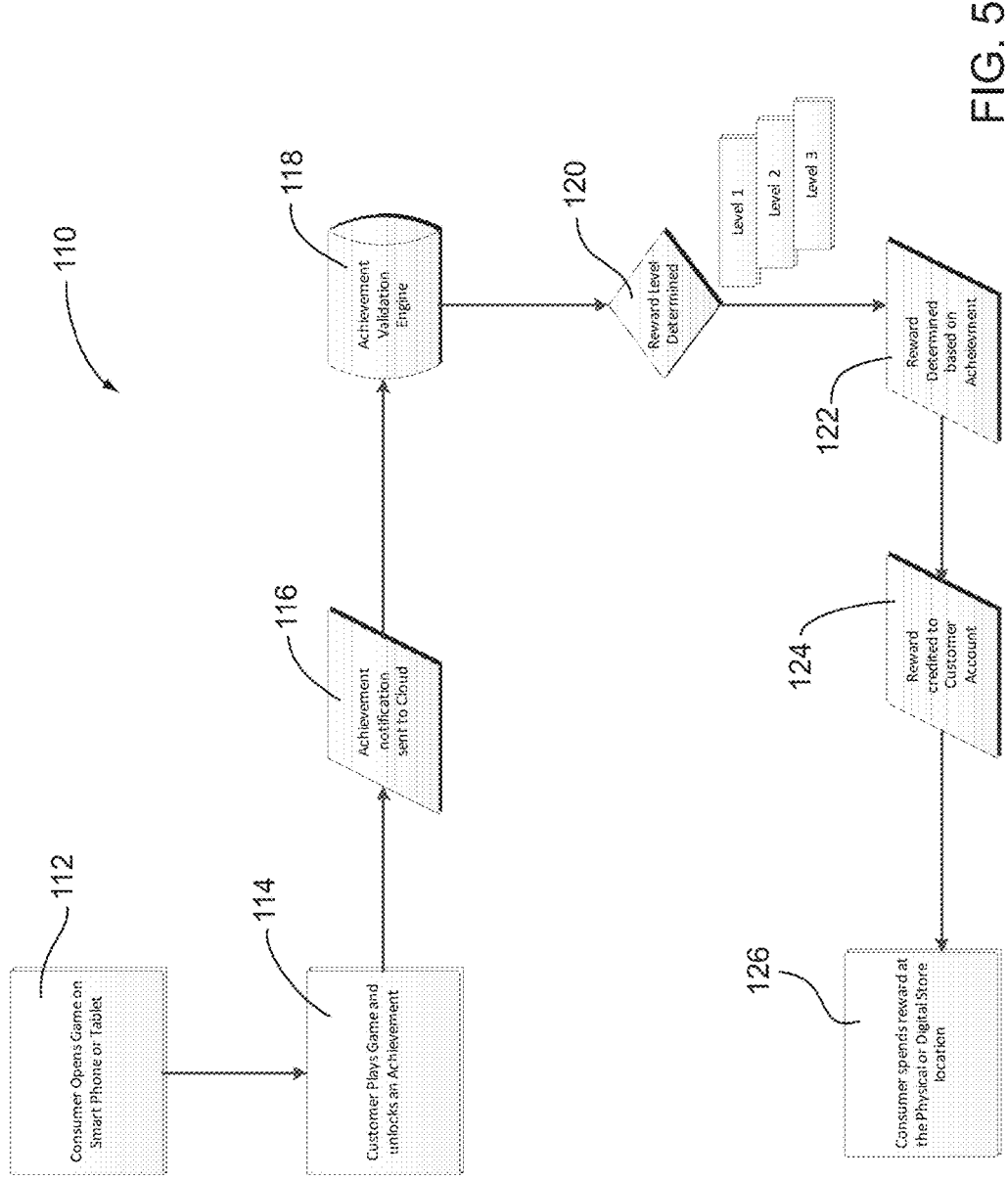
FIG. 5 is a flow diagram illustrating a method using an interactive gaming system, in accordance with some embodiments.

Referring to FIG. 5, depicted is a method 110 of using an interactive gaming system 10. The method 110 comprises operating a gaming application installed on a mobile computing device. This may be accomplished by the user opening the game in a mobile computing device in Step 112, such as opening the gaming application on a smartphone or tablet. The method 110 may then include the user playing the game and unlocking achievements in Step 114. The method 110 may include communicating data related to operation of the gaming application to an achievement engine communicatively coupled to the mobile computing device in Step 116, such as by sending an achievement notification to the achievement engine, such as a cloud application. The achievement engine may then store the data related to operation of the gaming application in memory of the achievement engine receives. The achievement validation engine may operate at Step 118 and determine the reward level at Step 120. The reward level may be Level 1, Level 2 or Level 3, as an example and not as a limitation. In Step 122 the system automatically generates a reward in the form of an electronic offer by the achievement engine based on the achievement and in Step 124 delivers the reward or the electronic offer to the mobile computing device in response to completing a predetermined event in the gaming application, wherein in Step 126, the electronic offer is redeemable in a physical store. The method 110 may further include determining by a tracking system that the mobile computing device operating the gaming application is within a store associated with the interactive gaming system; sending event data to the achievement engine in response to determining the user has performed an in-store trigger event; and receiving gaming benefits at the mobile computing device operating the gaming application gaming benefits for use in the gaming application in response to the achievement engine processing the event data received from the tracking system.

In operation of the method 110, the tracking system receives GPS data from the mobile computing device operating the gaming application to determine the location of the mobile computing device within the store; the tracking system receives a Wi-Fi beacon data to determine the location of the mobile computing device within the store; or the tracking system receives a Bluetooth beacon data to determine the location of the mobile computing device within the store.

In the method 110, sending event data comprises sending data related to a purchase of a predetermined item; or sending data related to operating a self-checkout a predetermined number of times within a predetermined time frame.

The method 110 further comprises receiving location information of the mobile computing device at the achievement engine; and automatically determining by the achievement engine the electronic offers available to send to the mobile computing device in response to processing the location information from the mobile computing device.

The following is an example of an interactive gaming system in accordance with embodiments of the present invention, and is not considered a limitation thereof.

Gameplay: (The Virtual World)

A customer logs into the gaming application 26 via the mobile computing device 40, such as, but not limited to a smartphone. From there the customer would engage in a virtual world where the customer builds a store, manages sales, expenses and customer happiness. The game would not be as deep as some online simulation games but still would present a challenging experience for the gamer. The gamers may compete against other gamers in the virtual world. Gamers may try to buy up ideal properties and create stores that drive sales and profit in this particular example of a gaming application.

In this gaming application, the gamer would create stores. The gamer would have the ability to grow the gamer's store by adding assortment, staffing, or entertainment features for the games "customers". As the game progresses the gamer's goal is to generate profit. The gamer generates profit by selling product and managing expenses. Profit is used throughout the game to add new features to the gamer's store, add staffing to the gamer's store or to buy land and build new stores.

Managing customer happiness is another factor to the game. Greater customer happiness equals more traffic through the gamer's stores. Customer happiness can be impacted by out of stocks, unclean stores, or long checkout lines.

Achievements and Unlocks: (the Real World)

Playing the Game and Getting Achievements:

Achievements throughout the game would provide discounts/coupons/special offers that a customer can use at a physical Walmart Store. For example, if a gamer reached $1M in sales for the gamer's virtual store the gamer may receive an eCoupon for a free rotisserie chicken. The gamer could then go to a store for which the gaming application is associated and receive the free chicken. As the gamer progresses and acquires new achievements the gamer would continue to get special offers or other rewards.

Shopping In-Store and Getting Unlocks:

As customers shop in the stores they can get special unlocks in the game if they meet certain qualifiers. An example of a qualifier would be if the customers purchase certain promoted items or make repeat trips to a store they can get new "unlocks" in the game. The customer would have his or her game downloaded on his or her smartphone. The customer would log into the game. When the customer enters a store associated with the game, the customer can be identified by using existing application features such as, but not limited to eReceipts, electronic pay, in-store experience app features like in-store Navigation, in-store beacons or Bluetooth connections. These different app features identify if the customer is in store or made purchases which would trigger unlocks when applicable. Using available data, the event is sent to the Achievements Engine. If the qualifier is met a special game "unlock" is sent to the app for the customer to access and use. When the customer opens the game the game would recognize if a new unlock was available and alert the customer. The customer can then decide to use the special unlock during their game.

For example, if the customer makes 7 trips to a store in a week, the customer may scan each of the receipts with a particular mobile application. A game unlock would be made available for customers who make 7 trips in a week. The app recognizes the customer met the criteria for a new unlock and unlocks a new feature in the game. The new feature would be exclusive to meeting the particular in-store qualifier and would give the gamer an advantage in the game.

It will be understood that while this particular type of gaming application has been explained as an example, there are many other types of gaming applications that can be utilized in order link the virtual game environment with a physical real world environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. An interactive gaming system comprising:
a mobile computing device operating a gaming application;
an achievement engine communicatively coupled to the mobile computing device, wherein the achievement engine receives and stores data related to use of the gaming application;
an electronic offer generated by the achievement engine and sent to the mobile computing device in response to a user completing a predetermined event in the gaming application operating on the mobile computing device, wherein the electronic offer is redeemable in a physical store associated with the interactive gaming system; and
a tracking system communicatively coupled to the achievement engine, the tracking system located in the physical store associated with the interactive gaming system, wherein:
the tracking system includes a Wi-fi beacon to identify the mobile computing device operating the gaming application in the store, communicates with the mobile computing device to receive a location of the mobile computing device within the physical store associated with the interactive gaming system and sends event data to the achievement engine in response to determining the user has performed an in-store process resulting in a triggered event, wherein the achievement engine:
determines if the triggered event is a qualifying event and records the same in a memory of the achievement engine;
operates rule based aggregation/counter software in order to determine an achievement associated with the qualifying event; and
triggers an achievement, wherein the triggered achievement is then communicated to the mobile computing device related to the in-store process;
the mobile computing device operating the gaming application receives gaming benefits for use in the gaming application in response to the achievement engine processing the event data received from the tracking system; and
the achievement engine automatically determines additional electronic offers available to send to the mobile computing device in response to processing location information from the mobile computing device including the location of the mobile computing device within the physical store associated with the interactive gaming system.

2. The system of claim 1, wherein the tracking system receives GPS data from the mobile computing device operating the gaming application, wherein the GPS data is used by the tracking system to determine that the mobile computing device is within the store.

3. The system of claim 1, wherein the tracking system includes a Bluetooth beacon, wherein the Bluetooth beacon communicates with the mobile computing device to determine the location of the mobile computing device within the store.

4. The system of claim 1, wherein the event data is a purchase of a predetermined item.

5. The system of claim 1, wherein the event data is operating a self-checkout a predetermined number of times within a predetermined time frame.

6. The system of claim 1, wherein the achievement engine receives location information from the mobile computing device.

7. The system of claim 1, wherein the gaming benefits comprise unlocking access and providing use of predetermined game features, providing increased gaming ability, and combinations thereof.

8. A method of using an interactive gaming system, the method comprising:
operating a gaming application installed on a mobile computing device;
communicating data related to operation of the gaming application to an achievement engine communicatively coupled to the mobile computing device;
storing the data related to operation of the gaming application in memory of the achievement engine;
automatically generating an electronic offer by the achievement engine and delivering the electronic offer to the mobile computing device in response to completing a predetermined event in the gaming application, wherein the electronic offer is redeemable in a physical store associated with the interactive gaming system;
determining by a tracking system that the mobile computing device operating the gaming application is within the physical store associated with the interactive gaming system;
sending event data to the achievement engine in response to determining the user has performed an in-store process resulting in a triggered event, wherein the achievement engine:
determines if the triggered event is a qualifying event and records the same in a memory of the achievement engine;
operates rule based aggregation/counter software in order to determine an achievement associated with the qualifying event; and
triggers an achievement, wherein the triggered achievement is then communicated to the mobile computing device related to the in-store process;
receiving gaming benefits at the mobile computing device operating the gaming application gaming benefits for use in the gaming application in response to the achievement engine processing the event data received from the tracking system;
receiving location information of the mobile computing device, including receiving Wi-Fi beacon data to determine a location of the mobile computing device within the physical store associated with the interactive gaming system at the achievement engine; and
automatically determining by the achievement engine additional electronic offers available to send to the mobile computing device in response to processing the location information from the mobile computing device.

9. The method of claim 8, wherein the tracking system receives GPS data from the mobile computing device operating the gaming application to determine the location of the mobile computing device within the store.

10. The method of claim 8, wherein the tracking system receives a Bluetooth beacon data to determine the location of the mobile computing device within the store.

11. The method of claim 8, wherein sending event data comprises sending data related to a purchase of a predetermined item.

12. The method of claim 8, wherein sending event data comprises sending data related to operating a self-checkout a predetermined number of times within a predetermined time frame.

* * * * *